DANIEL J. TITTLE.
Improvement in Slate-Pencil Machines.
No. 127,440.                                Patented June 4, 1872.
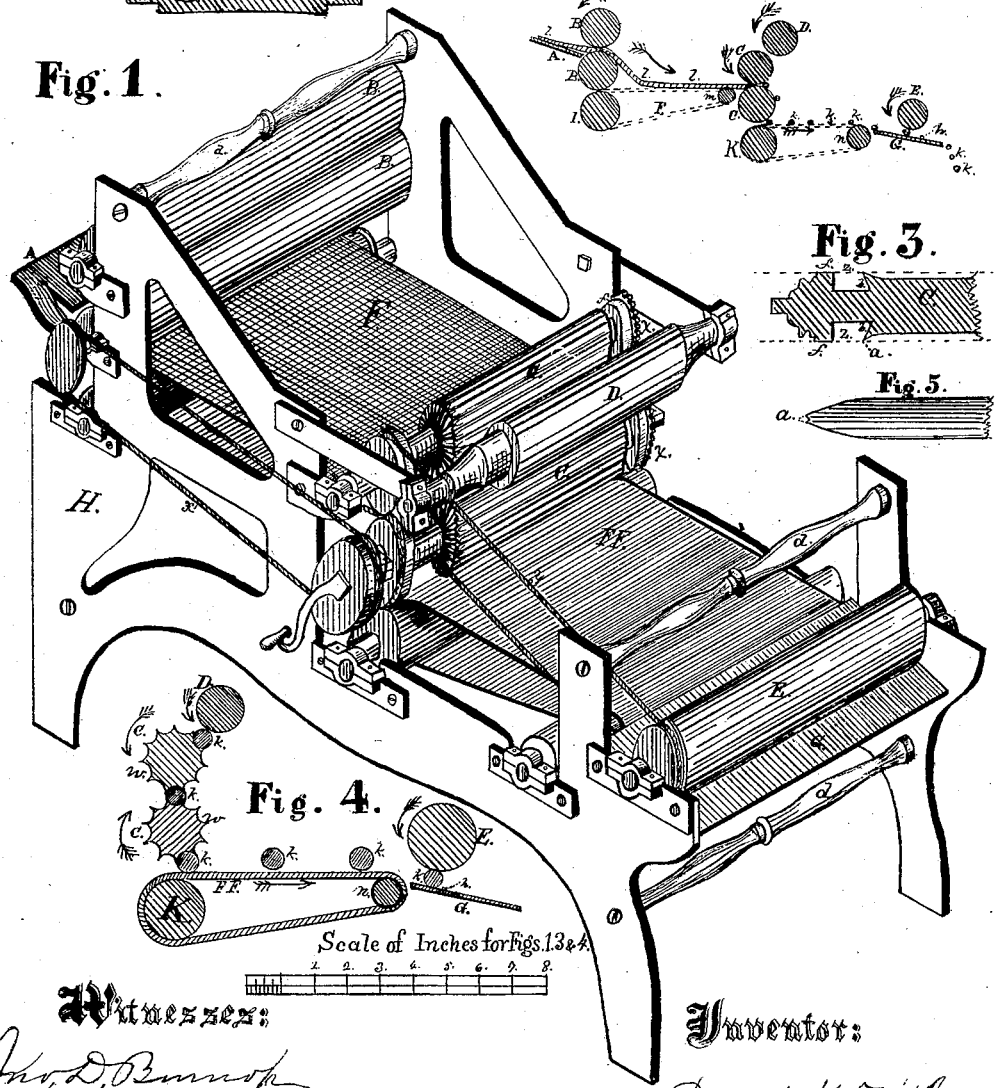

UNITED STATES PATENT OFFICE.

DANIEL J. TITTLE, OF ALBANY, NEW YORK, ASSIGNOR TO ABBIE M. TITTLE, OF SAME PLACE.

IMPROVEMENT IN SLATE-PENCIL MACHINES.

Specification forming part of Letters Patent No. 127,440, dated June 4, 1872.

Specification describing certain Improvements in Machines for Making Slate-Pencils from plastic material, invented by DANIEL J. TITTLE, of Albany, in the county of Albany and State of New York.

My invention relates to the preparation, by means of suitable concave receiving-rolls, of a plastic mass of material out of which slate-pencils may be made; also, to a peculiar construction of rotary dies by which the pencils are cut and formed by one operation; also, in the combination of a releasing-roller with the revolving dies; and in the arrangement of an endless carrier and a finishing-roller with said dies.

Figure 1 is a perspective view of a machine embodying my invention. Fig. 2 is a side elevation of the principal parts of the same. Fig. 3 is a sectional view of the pointed end of cutting and forming dies. Fig. 4 is a central vertical section of dies, finishing-roll, and their connecting parts. Fig. 5 is a top view of pointed end of one die. Fig. 6 is a longitudinal section of receiving-rolls.

H is the frame of the machine, which should be made preferably of cast iron, having suitable bearings upon its opposite sides for the support of the various rolls and dies, as shown in Fig. 1. A is a platform placed in front of receiving-rolls B B. B B are two rolls of cylindrical form, having their central diameters a little smaller, as shown in Fig. 6, so that the sheet $l$ of plastic material rolled between them will be thicker in the middle than at its ends. F is an endless apron supported upon two rolls, I $m$, as shown in Figs. 1 and 2. Said endless apron or carrier F extends from beneath the lower receiving-roll B to a point nearly in contact with and just in front of the pair of cutting and forming dies C C, as shown in Figs. 1 and 2. C C are two revolving cylindrical rolls, having semicircular grooves $w$ cut in the direction of their length from end to end, one end of said grooves $w$ being made pointed, as shown in Figs. 1, 3, and 5. At the pointed ends of said grooves $w$ the roller or die C is undercut, as shown in Fig. 3, to allow any superfluous material to fall clear of the rolls. The extreme points of grooves $w$ are cut away in such a manner as to leave an air-escape passage when the dies are in the position shown in Fig. 5, to allow any bubbles of air to escape while said mass is under pressure of dies C C. Upon each end of dies C C are flanges $ff$ of the same diameter as that of the cylinder upon which grooves $w$, as aforementioned, are cut. The object of said flanges is to protect the cutting-edges of dies C C. Upon one end of dies C C are spur-wheels X X, thus connecting the said revolving dies C C in such a manner as to insure a perfect contact of the cutting-edges of the dies, as shown in Figs. 1 and 4. D is a roller of any suitable material. Its surface may be plain or corrugated. Said roller D is placed at the back of the upper die C, as shown in Figs. 1, 2, and 4. F F is an endless carrier supported upon two rollers, K and $n$. Roller K is placed far enough under the lower die C so as to bring the apron or carrier F F nearly against said lower die C, as shown in Fig. 4. E is a finishing-roller which is placed at the end of the second endless apron or carrier F F, as shown in Figs. 1, 2, and 4. Beneath roller E is an incline, G, which incline is placed as far below the roller E as the diameter of the pencil made by dies C C. Upon the said incline G, at a point immediately beneath roller E, there may be a row of type to stamp the pencil as it is rolled out finished by roller E. One flange, $f$, on each end of dies C may extend upward or lap over its fellow, to prevent the mass of plastic material from clogging said flanges. If finishing-roller E be placed upon and near the end of apron F F, it will be necessary to have a board or support underneath said apron F F, immediately below where roller E may be placed. In this case it will not be necessary to have incline G. Motion is conveyed to the various parts of the machine in the usual and well-known manner. The direction of the motion is indicated by arrows.

The mode of operation of my machine will be as follows: The mass of plastic material is first prepared of a proper consistency, and may be rolled into a sheet of nearly the right thickness. This sheet is dusted or faced upon both sides, to prevent it from sticking to the rollers or dies as it passes through the machine. As the plastic sheet passes through rollers B B it is reduced to a sheet which is thicker in the middle than at the sides. This is done for the purpose of producing a flow of the plastic mass from the center toward the ends of the dies. This insures the perfect filling of the grooves $w$. The pencils, after being cut out and formed, are delivered upon a second carrier, F F. The motion of carrier or apron F F is such as to remove the pencils as fast as they are delivered from dies C C. Should any pencils adhere to the upper die C they will be removed therefrom by roller D, and in a similar manner all pencils adhering to the lower die C will be removed by the upper surface of the endless apron F F. The pencils are carried onward to finishing-roller E. Here they are rolled between this roller and the incline G, which operation will remove the little seams left upon the pencils in passing through dies C C. The pencils may here be stamped, if required, by having the necessary type upon incline G immediately underneath roller E. When roller E is placed upon carrier F F the type cannot be thus used.

My invention may be used to make bath-pipe or any kind of confectionery or similar plastic material into similar form.

What I claim as new, and desire to secure by Letters Patent, is—

1. Receiving-rolls B B, when constructed with concave surfaces and combined with platform A and endless apron F, as herein shown and for the purpose set forth.

2. In cylindrical revolving dies C, the undercut $b$ at the pointed end of said dies and air-escape $a$, for the purpose herein shown and set forth.

3. Releasing-roller D, in combination with revolving dies C C, substantially as and for the purpose herein shown.

4. The combination of die-rollers C C, endless apron F F, and finishing-roller E, when constructed and arranged in the manner and for the purpose set forth.

5. The combination and arrangement of receiving-rolls B B, incline A, and endless carrier F with revolving, cutting, and forming dies C C, roller D, endless carrier F F, and finishing-roller E, with or without incline G, as herein shown and set forth.

DANIEL J. TITTLE.

Witnesses:
  JNO. D. BURNAP,
  THOS. HOUGHTON.